United States Patent
Shinkai et al.

(10) Patent No.: US 6,615,634 B2
(45) Date of Patent: Sep. 9, 2003

(54) PLATE WIDTH ADJUSTING APPARATUS AND PLATE WIDTH ADJUSTING METHOD

(75) Inventors: Tetsuya Shinkai, Hiroshima-ken (JP); Kensuke Fujimura, Himeji (JP); Haruhisa Sugimoto, Himeji (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/875,905

(22) Filed: Jun. 8, 2001

(65) Prior Publication Data

US 2002/0014320 A1 Feb. 7, 2002

(30) Foreign Application Priority Data

Jun. 8, 2000 (JP) ........................................ 2000-172448

(51) Int. Cl.$^7$ ................................................ B21B 39/08
(52) U.S. Cl. ........................... 72/205; 72/8.3; 72/11.1; 72/161; 72/203
(58) Field of Search .................... 72/8.3, 11.1, 160, 72/161, 203, 205, 366.2; 700/150

(56) References Cited

U.S. PATENT DOCUMENTS

| | | | | |
|---|---|---|---|---|
| 4,248,072 A | * | 2/1981 | Hasegawa et al. | 72/240 |
| 4,593,548 A | * | 6/1986 | Hashimoto et al. | 72/161 |
| 4,765,169 A | * | 8/1988 | Bradlee | 72/160 |
| 4,819,470 A | * | 4/1989 | Noe et al. | 72/161 |
| 5,161,400 A | * | 11/1992 | Lefor | 72/161 |
| 5,381,342 A | * | 1/1995 | Noe | 72/11.1 |
| 6,418,354 B1 | * | 7/2002 | Brose et al. | 700/150 |

FOREIGN PATENT DOCUMENTS

| | | | | |
|---|---|---|---|---|
| JP | 60-221101 | * | 11/1985 | 72/205 |
| JP | 61-37323 | * | 2/1986 | 72/205 |
| JP | 63-90305 | * | 4/1988 | 72/205 |

* cited by examiner

*Primary Examiner*—Ed Tolan
(74) *Attorney, Agent, or Firm*—Birch, Stewart, Kolasch & Birch, LLP

(57) ABSTRACT

A plate width adjusting apparatus 1 for adjusting a strip 53 for a predetermined plate width, which is installed on a production line for the strip 53, is provided with bridle rolls 2 and 3. The bridle rolls 2 and 3 give tension in the transfer direction to the strip 53 being transferred on the production line to elongate the strip 53 in the transfer direction, by which the plate width of the strip 53 is adjusted.

8 Claims, 8 Drawing Sheets

PLATE WIDTH ADJUSTING APPARATUS AND PLATE WIDTH ADJUSTING METHOD

BACKGROUND OF THE INVENTION

The present invention relates to a plate width adjusting apparatus and a plate width adjusting method for a strip, which are used on a strip production line and the like.

A method using a trimmer has so far been known as a method for adjusting the plate width of a strip on a strip production line such as a pickling line and an annealing line. For example, as shown in FIG. 8, on a strip production line 50, there are provided trimmers 51, 51 at the right and left edge portions of a strip 53 transferred continuously in the lengthwise direction. The trimmer 51 has a pair of circular saws 52, 52, and is configured so that the circular saws 52 can be moved in the plate width direction (direction perpendicular to the transfer direction) of the strip 53. The trimmer 51 trims an edge portion exceeding a given specified width of the strip 53 passing between the circular saws 52, 52.

The above-described plate width adjusting method has a problem in that both edge portions of the strip 53 are disposed of as trim scrap, so that a loss in material is produced, leading to a decreased yield of product.

SUMMARY OF THE INVENTION

The present invention has been made to solve the above problem, and accordingly an object thereof is to provide a plate width adjusting apparatus and a plate width adjusting method that can increase the yield of product.

In accordance with the present invention, there is provided a plate width adjusting apparatus for adjusting a strip for a predetermined plate width, which is installed on a production line for the strip, comprising elongating means for elongating the strip being transferred on the production line in the transfer direction of the strip, characterized in that by the elongation of the strip in the transfer direction by using the elongating means, the strip is shrunken in the width direction, thereby adjusting the plate width.

In a preferred embodiment, the elongating means comprises tension generating means for giving tension in the transfer direction to the strip being transferred and bending means for giving bending force to the strip having been given the tension.

In a preferred embodiment, the apparatus further comprises detecting means for detecting the plate width of the strip, which is installed on the downstream side of the installation position of the elongating means in the transfer direction of the strip, and a detected value of the detecting means is compared with a preset specified value, by which the plate width is adjusted so that the plate width of the strip takes the specified value.

In a preferred embodiment, the apparatus further comprises cutting means for cutting edges of the strip, which is installed on the downstream side of the installation position of the detecting means in the transfer direction, and cutting control means for causing the cutting means to perform cutting operation on the basis of the detected value of the detecting means so that the strip has a predetermined specified width.

In a preferred embodiment, the apparatus further comprises correction means for correcting a warp in the strip by giving a vertical pressure to the strip.

In another aspect of the present invention, there is provided a plate width adjusting method for adjusting a strip for a predetermined plate width on a production line for the strip, comprising the steps of elongating the strip being transferred on the production line in the transfer direction of the strip; and shrinking the strip in the width direction by means of the elongation of the strip, thereby adjusting the plate width.

In a preferred embodiment, the strip is elongated by giving tension in the transfer direction to the strip being transferred and by giving bending force to the strip having been given the tension.

In a preferred embodiment, a warp in the strip is corrected by giving a vertical pressure to the strip having been elongated.

According to the present invention, the strip is elongated in the transfer direction and is shrunken in the width direction thereof, by which the plate width of the strip can be adjusted. Therefore, narrow trim scrap is not produced by the cutting of both edge portions of the strip at the time of plate width adjustment for the strip, so that a loss in strip material can be eliminated, whereby the yield of product can be increased.

Also, tension in the transfer direction is given to the strip and bending force is given to the strip to elongate the strip, by which the strip can be elongated easily and sufficiently. Therefore, desired plate width adjustment can be made securely.

DETAILED DESCRIPTION OF THE PREFERRED EMBODIMENTS

Figure 1:
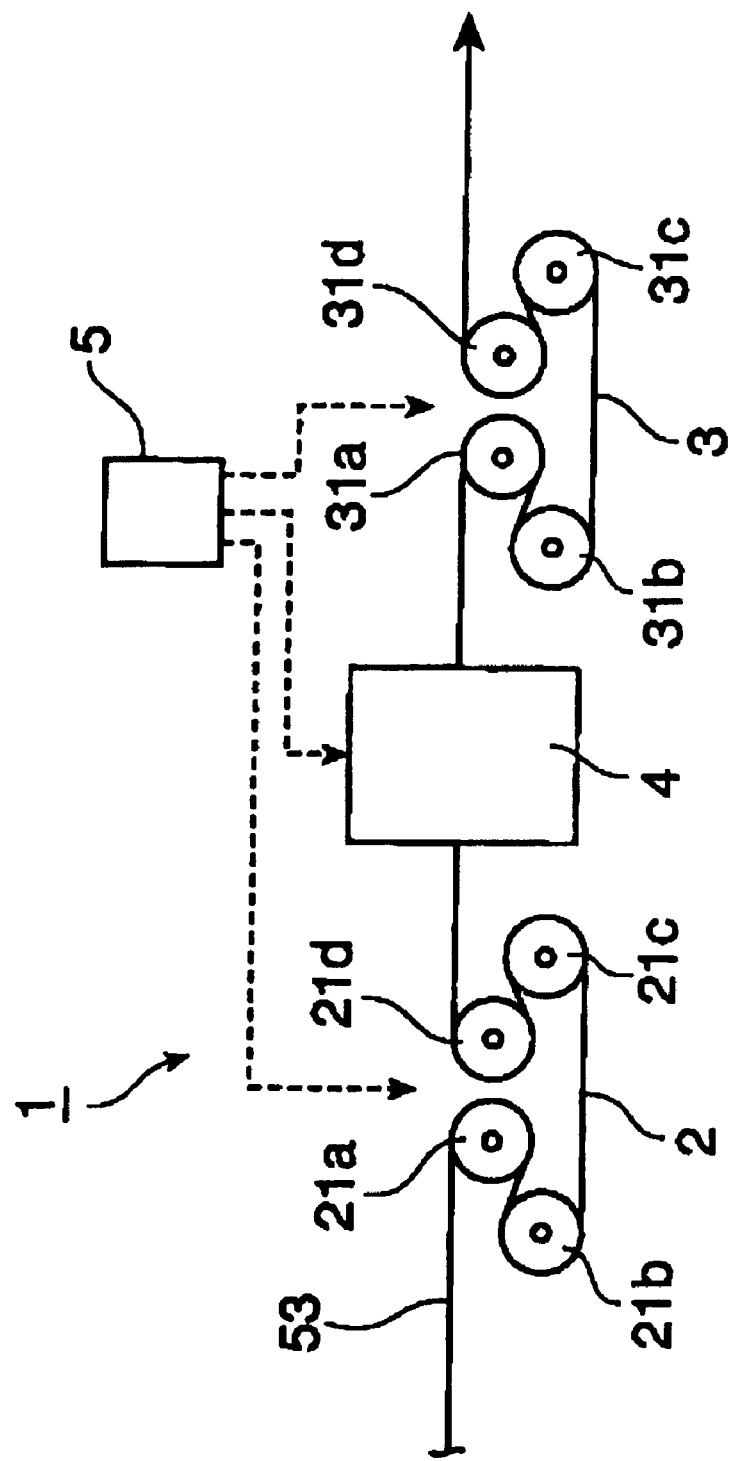
FIG. 1 is an explanatory view of a plate width adjusting apparatus and a plate width adjusting method in accordance with a first embodiment of the present invention.

Various embodiments of the present invention will now be described with reference to the accompanying drawings. In the figures, the same reference numerals are applied to the same elements, and duplicate explanation is omitted. Also, the dimension ratio in the figure does not necessarily coincide with that in the explained figure.

FIG. 1 is a schematic configuration view of a plate width adjusting apparatus in accordance with a first embodiment. A plate width adjusting apparatus 1 in accordance with this embodiment, which is a tension leveler installed on a strip production line such as a pickling line and an annealing line, includes a first bridle roll 2, a second bridle roll 3, a leveler 4, and a control unit 5.

The first bridle roll 2, which constitutes a part of tension generating means for giving tension to a strip 53, is formed of a plurality of rolls 21, and sets the strip 53 transferred continuously around the rolls 21 successively. The first bridle roll 2 is made up of, for example, four rolls 21a to 21d each having an axis extending in the direction perpendicular to the transfer direction of the strip 53.

The roll 21a is installed at a position adjacent to the transfer path of the strip 53. The roll 21b is installed at a position further away from the transfer path of the strip 53 than the installation position of the roll 21a and on the upstream side of transfer of the strip 53 (hereinafter referred simply to as "the upstream side"). The roll 21c is installed at a position on the downstream side of transfer of the strip 53 (hereinafter referred simply to as "the downstream side") with respect to the installation position of the roll 21b. The roll 21d is installed at a position closer to the transfer path of the strip 53 than the installation position of the roll 21c.

By setting the strip 53 around the rolls 21a, 21b, 21c and 21d successively, the strip 53 is prevented from slipping on the peripheral faces of the rolls 21a to 21d, so that the strip 53 can be transferred while being held securely by the peripheral faces of the rolls 21a to 21d.

The second bridle roll 3, which constitutes tension generating means for giving tension to the strip 53 together with the first bridle roll 2, is disposed on the downstream side of the first bridle roll 2. The second bridle roll 3 is configured in the same manner as the first bridle roll 2. For example, it is made up of four rolls 31a to 31d each having an axis extending in the direction perpendicular to the transfer direction of the strip 53.

These rolls 31a to 31d are installed in the same way as the rolls 21a to 21d, and the strip 53 is set around these rolls 31a to 31d successively. By setting the strip 53 around the rolls 31a to 31d successively, the strip 53 is prevented from slipping on the peripheral faces of the rolls 31a to 31d.

Also, the rotation of the second bridle roll 3 is controlled so that a high tension may be produced on the strip 53 between the first bridle roll 2 and the second bridle roll 3. For example, the rotational speeds of the rolls 31a to 31d of the second bridle roll 3 are set so as to be higher than the rotational speeds of the rolls 21a to 21d of the first bridle roll 2 so that a desired tension may be produced on the strip 53 between the first bridle roll 2 and the second bridle roll 3.

Although the first bridle roll 2 and the second bridle roll 3 each having four rolls have been described in this embodiment, the first bridle roll 2 and the second bridle roll 3 may have any number of rolls if they can give a predetermined tension to the strip 53.

The lever 4, which is bending means for giving bending force to the transferred strip 53, constitutes elongating mean for elongating the strip 53 together with the first bridle roll 2 and the second bridle roll 3. The leveler 4 is installed at a midpoint of the transfer path of the strip 53 between the first bridle roll 2 and the second bridle roll 3. The details of the leveler 4 will be described later.

The control unit 5, which is control means for controlling the first bridle roll 2, second bridle roll 3, and leveler 4, sends a control signal to the first bridle roll 2, second bridle roll 3, and leveler 4 to control the tension produced on the strip 53 by the first bridle roll 2 and the second bridle roll 3 and the bending force of the leveler 4 by means of the control signal. The control items of the control unit 5 are set appropriately according to information about the material properties, plate thickness, and the like of the strip 53 transferred on the production line.

Figure 2:
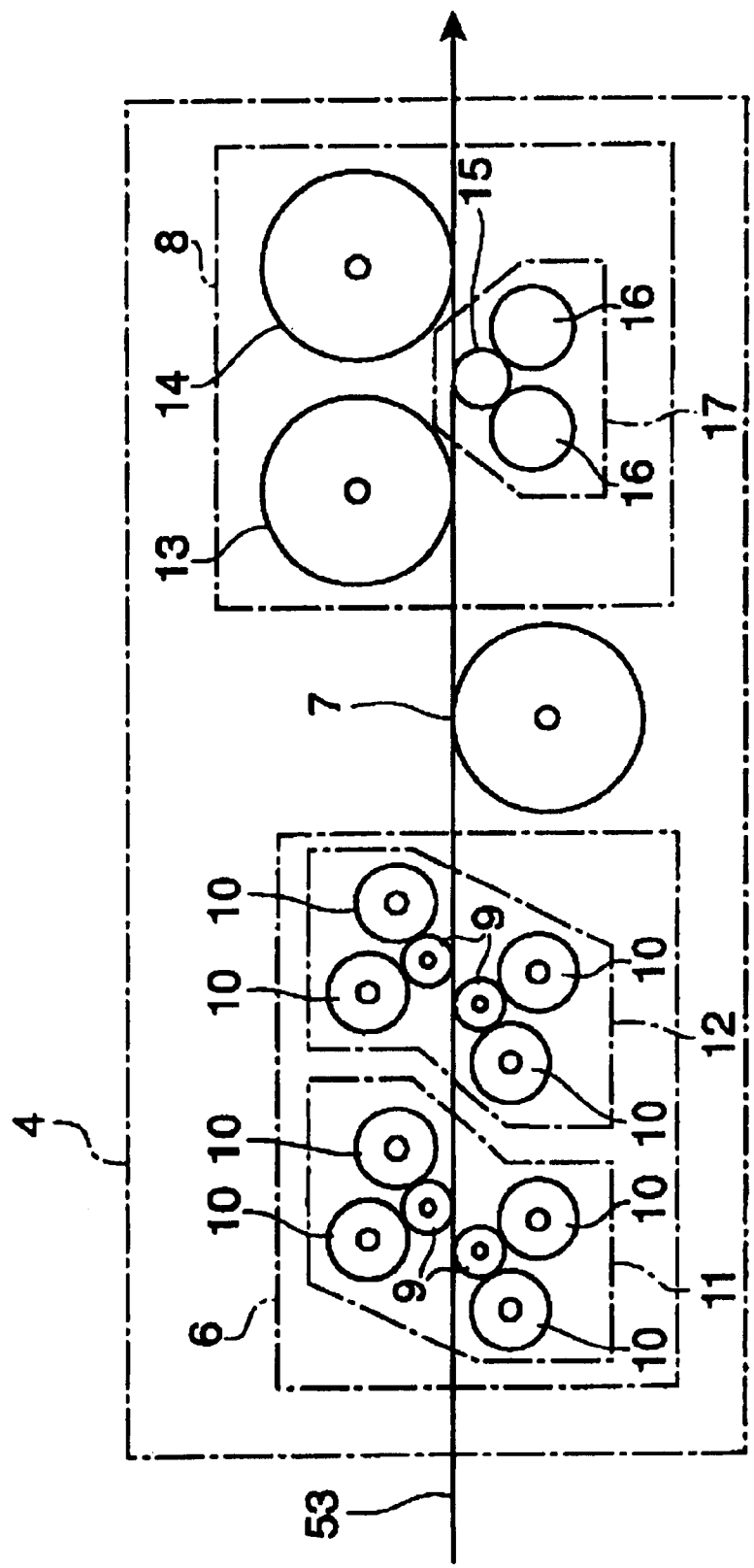
FIG. 2 is an explanatory view of a leveler in the plate width adjusting apparatus shown in FIG. 1.

FIG. 2 is a schematic explanatory view of the leveler.

As shown in FIG. 2, the leveler 4 includes an elongation unit 6, a warp correction unit 8, and a bottom deflector roll 7. The elongation unit 6, warp correction unit 8, and bottom deflector roll are arranged in the order of the elongation unit 6, bottom deflector roll 7, and warp correction unit 8 from the upstream side.

The elongation unit 6 has two sets of bending roll groups 11 and 12. The bending roll groups 11 and 12 each include a pair of top and bottom work rolls 9 and two backup rolls 10 disposed in contact with each of the work rolls 9. The top work roll 9 is disposed at a position shifting from the bottom work roll 9 to the downstream side.

According to the elongation unit 6, the bottom work rolls 9, 9 or the top work rolls 9, 9 go up and down together with the adjacent backup rolls 10 in the bending roll groups 11 and 12, by which bending force can be given to the strip 53 passing between the top work roll 9 and the bottom work roll 9.

The warp correction unit 8 has an upstream top deflector roll 13, a downstream top deflector roll 14, and a bending roll group 17. The upstream top deflector roll 13, downstream top deflector roll 14, and bending roll group 17 are arranged in the order of the upstream top deflector roll 13, bending roll group 17, and downstream top deflector roll 14 from the upstream side. The top deflector rolls 13 and 14 are disposed on the upper side of the transfer path, and the bending roll group 17 is disposed on the lower side thereof.

The bending roll group 17 includes a bottom work roll 15 and two backup rolls 16, 16 disposed in contact with the bottom work roll 15.

According to the warp correction unit 8, the strip 53 being transferred is pressed from the downside by the bending roll group 17 disposed between the top deflector roll 13 and the top deflector roll 14 in a state of being pushed from the upside by the top and bottom deflector rolls 13 and 14. By this pressing operation, a warp in the strip 53 is corrected.

Next, the operation of the plate width adjusting apparatus 1 and a plate width adjusting method in accordance with this embodiment will be described.

As shown in FIG. 1, the strip 53 sent out of a payoff reel (not shown) or the like is transferred continuously in the lengthwise direction thereof, and is introduced into the first bridle roll 2. In the first bridle roll 2, the strip 53 is transferred while passing around the rolls 21a, 21b, 21c and 21a successively. Therefore, the strip 53 is prevented from slipping on the peripheral faces of the rolls 21a to 21d, so that the strip 53 is transferred while being held securely by the peripheral faces of the rolls 21a to 21d.

On the other hand, on the downstream side of the production line, the strip 53 is introduced into the second bridle roll 3. In the second bridle roll 3, the strip 53 is transferred while passing around the rolls 31a, 31b, 31c and 31a successively. Therefore, the strip 53 is prevented from slipping on the peripheral faces of the rolls 31a to 31d.

Also, the rotation of the rolls 31 of the second bridle roll 3 is controlled appropriately, by which the strip 53 on the upstream side of the second bridle roll 3 is pulled strongly to the downstream side. At this time, since the upstream side of the strip 53 is held by the first bridle roll 2, the strip 53 is not moved easily to the downstream side by the pull of the second bridle roll 3. Therefore, a high tension in the transfer direction is produced between the first bridle roll 2 and the second bridle roll 3.

Between the first bridle roll 2 and the second bridle roll 3, the strip 53 is introduced into the leveler 4. As shown in FIG.

2, in the leveler 4, the strip 53 is first introduced into the elongation unit 6.

In the elongation unit 6, the strip is passed between the top and bottom work rolls 9, 9 in the bending roll groups 11 and 12. At this time, the bottom work roll 9 or the top work roll 9 goes up and down together with the adjacent backup rolls 10. By this vertical movement of the work roll, bending force is given to the strip 53 passing between the top work rolls 9 and the bottom work roll 9.

By giving the bending force to the strip 53 in a state in which the strip 53 is subjected to tension in the transfer direction, the strip 53 is elongated in the transfer direction and is shrunken in the width direction. The shrinkage in the width direction of the strip 53 can be adjusted by appropriately controlling the tension and bending force given to the strip 53.

Then, the strip 53 passes through the bottom deflector roll 7, and is introduced in the warp correction unit 8. In the warp correction unit 8, the strip 53 is pressed from the downside by the bending roll group 17 disposed between the top deflector roll 13 and the top deflector roll 14 in a state of being pushed from the upside by the top and bottom deflector rolls 13 and 14. By this pressing operation, a warp in the strip 53 is corrected.

As described above, according to the plate width adjusting apparatus and the plate width adjusting method in accordance with this embodiment, the strip 53 is elongated in the transfer direction and is shrunken appropriately in the width direction thereof, by which the plate width of the strip 53 can be adjusted for a predetermined plate width. Therefore, narrow trim scrap is not produced by the cutting of both edge portions of the strip 53 at the time of plate width adjustment for the strip 53, so that a loss in strip material is eliminated, leading to an increased yield of product.

Also, tension in the transfer direction is given to the strip 53 and bending force is given to the strip 53 to elongate the strip 53, by which the strip can be elongated easily and sufficiently. Therefore, desired plate width adjustment can be made securely.

Second Embodiment

Next, a plate width adjusting apparatus and a plate width adjusting method in accordance with a second embodiment will be described.

Figure 3:
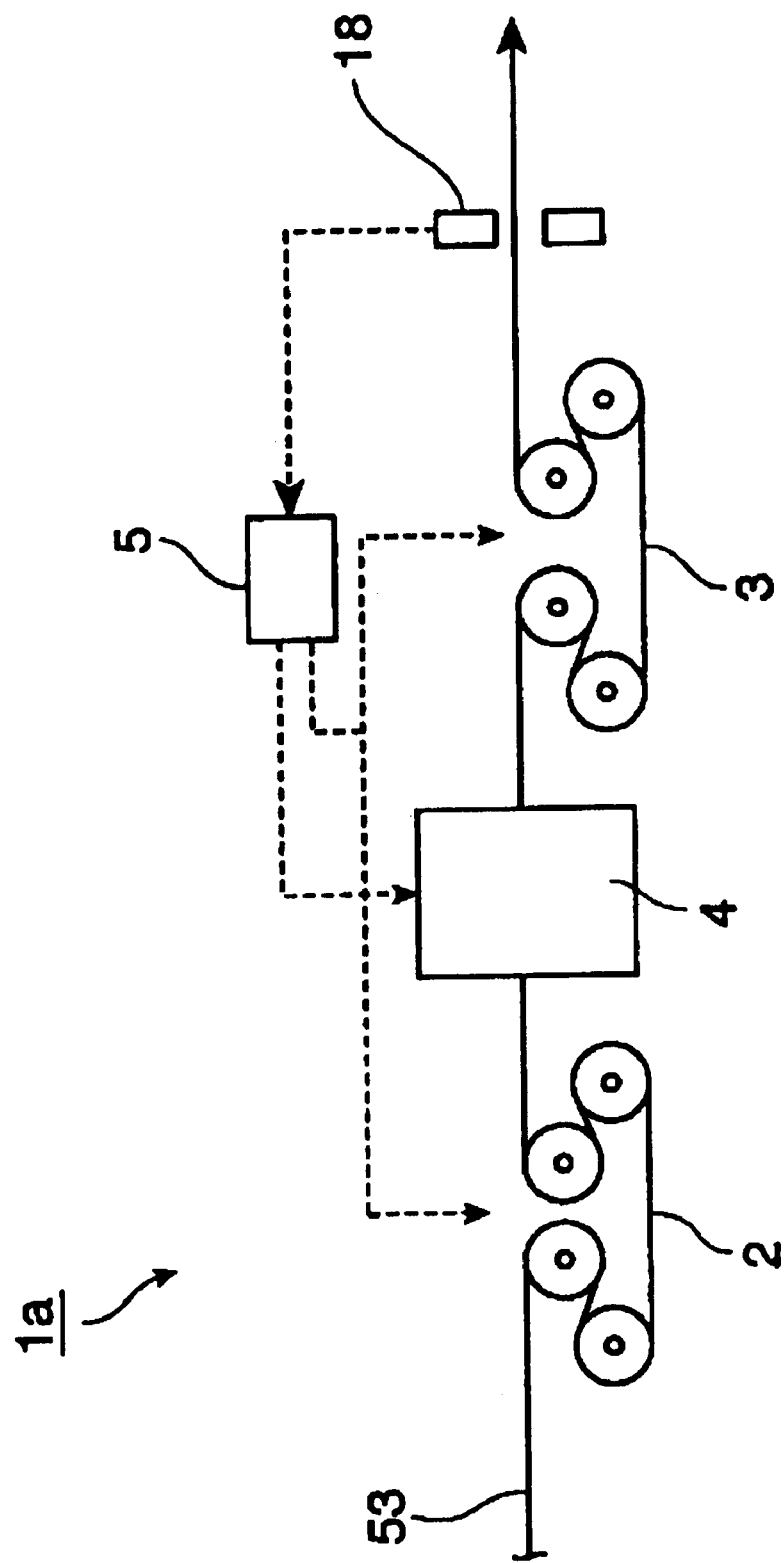
FIG. 3 is an explanatory view of a plate width adjusting apparatus and a plate width adjusting method in accordance with a second embodiment of the present invention.

FIG. 3 is a schematic configuration view of a plate width adjusting apparatus in accordance with this embodiment. As shown in FIG. 3, a plate width adjusting apparatus 1a in accordance with this embodiment, which is installed on a strip production line such as a pickling line and an annealing line, includes the first bridle roll 2, the second bridle roll 3, the leveler 4, and the control unit 5, like the plate width adjusting apparatus 1 in accordance with the first embodiment. Also, the plate width adjusting apparatus 1a is provided with a plate width detector 18 disposed on the downstream side of the second bridle roll 3.

The plate width detector 18 is plate width detecting means for detecting the plate width of the strip 53 being transferred. As the plate width detector 18, any type of detector such as mechanical type, acoustic type, and optical type may be used if it can detect the plate width of the strip 53. The detection signal of the plate width detector 18 is sent to the control unit 5. The control unit 5 compares the detected value of the plate width detector 18 with a preset specified value, and controls the tension between the first bridle roll 2 and the second bridle roll 3 and the bending force of the leveler 4 so that the plate width of the strip 53 takes the specified value.

Next, the operation of the plate width adjusting apparatus 1a and a plate width adjusting method in accordance with this embodiment will be described.

As shown in FIG. 3, as described in the first embodiment, the strip 53 sent out of a payoff reel (not shown) or the like is transferred continuously in the lengthwise direction thereof, and is introduced into the first bridle roll 2, the leveler 4, and the second bridle roll 3 successively, by which the strip 53 is elongated in the lengthwise direction.

The plate width of the strip 53 is detected by the plate width detector 18, and the detection signal is sent to the control unit 5. The control unit 5 compares the detected value of the plate width detector 18 with a preset specified value, and appropriately regulates the tension between the first bridle roll 2 and the second bridle roll 3 and the bending force of the leveler 4 so that the plate width of the strip 53 takes the specified value, thereby making plate width adjustment so that a difference between the detected value of plate width and the specified value becomes zero. Thereby, more accurate plate width adjustment can be made.

As described above, according to the plate width adjusting apparatus and the plate width adjusting method in accordance with this embodiment, the plate width of the strip 53 is detected and feedback control is carried out, by which more accurate plate width adjustment can be made.

Third Embodiment

Next, a plate width adjusting apparatus and a plate width adjusting method in accordance with a third embodiment will be described.

Figure 4:
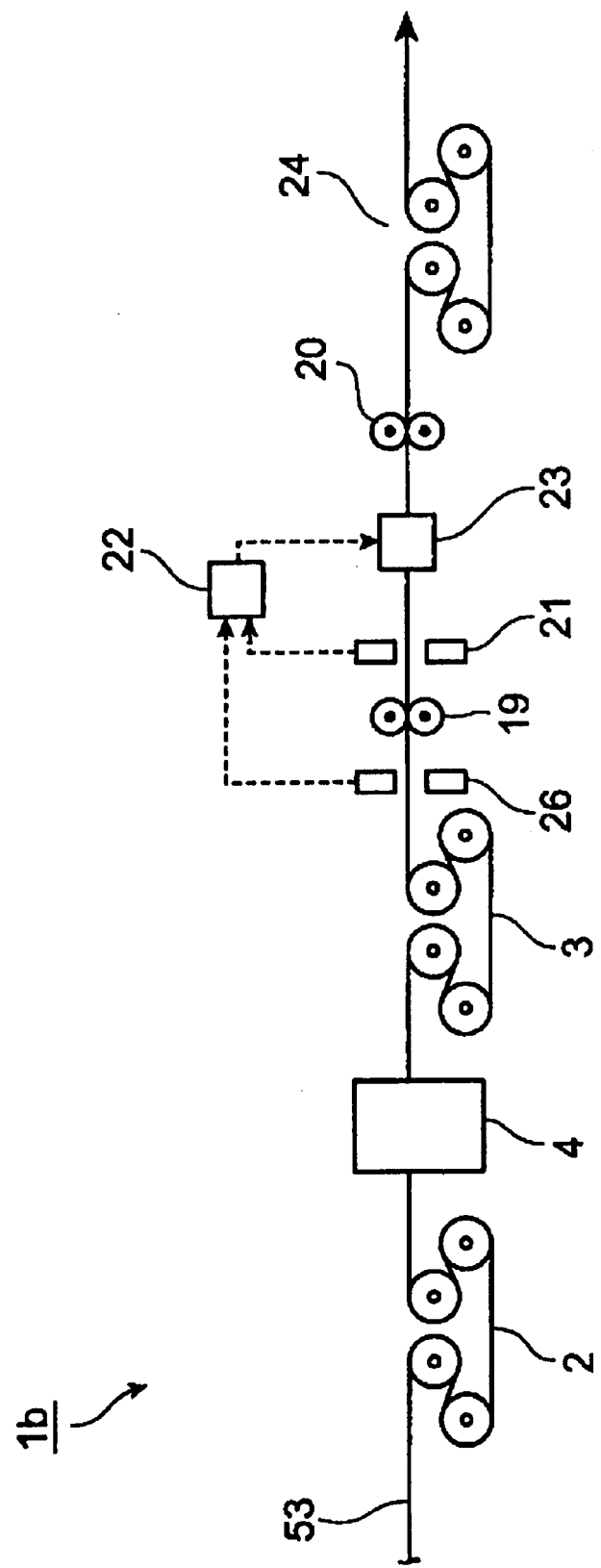
FIG. 4 is an explanatory view of a plate width adjusting apparatus and a plate width adjusting method in accordance with a third embodiment of the present invention.

FIG. 4 is a schematic configuration view of a plate width adjusting apparatus in accordance with this embodiment. As shown in FIG. 4, a plate width adjusting apparatus 1b in accordance with this embodiment, which is installed on a strip production line such as a pickling line and an annealing line, includes the first bridle roll 2, the second bridle roll 3, and the leveler 4, like the plate width adjusting apparatus 1 in accordance with the first embodiment.

Also, the plate width adjusting apparatus 1b is provided with two sets of pinch rolls 19 and 20 disposed on the downstream side of the second bridle roll 3. The pinch rolls 19 and 20 hold the strip 53 therebetween to keep it horizontal.

On the upstream side of the pinch rolls 19, a plate width detector 26 is provided. The plate width detector 26 is plate width detecting means for detecting the plate width of the strip 53 being transferred. Between the pinch rolls 19 and 20, plate edge detectors 21 and edge millers 23 are provided. The plate edge detector 21 is plate edge detecting means for detecting the plate edge of the strip 53 being transferred. The edge miller 23 is cutting means for cutting the edge portion of the strip 53 being transferred. The detection signals of the plate width detector 26 and the plate edge detectors 21 are sent to a control unit 22. The control unit 22, which is cutting control means for controlling the cutting operation of the edge millers 23, controls the operation of the edge millers 23 on the basis of the detection signals of the plate width detector 26 and the plate edge detectors 21.

Also, on the downstream side of the pinch rolls 20, a third bridle roll 24 is provided. The third bridle roll 24, which gives tension to the strip 53 cut by the edge millers 23 at a position between the second bridle roll 3 and the third bridle roll 24, is configured in the same manner as the first and second bridle rolls 2 and 3.

Figure 5:
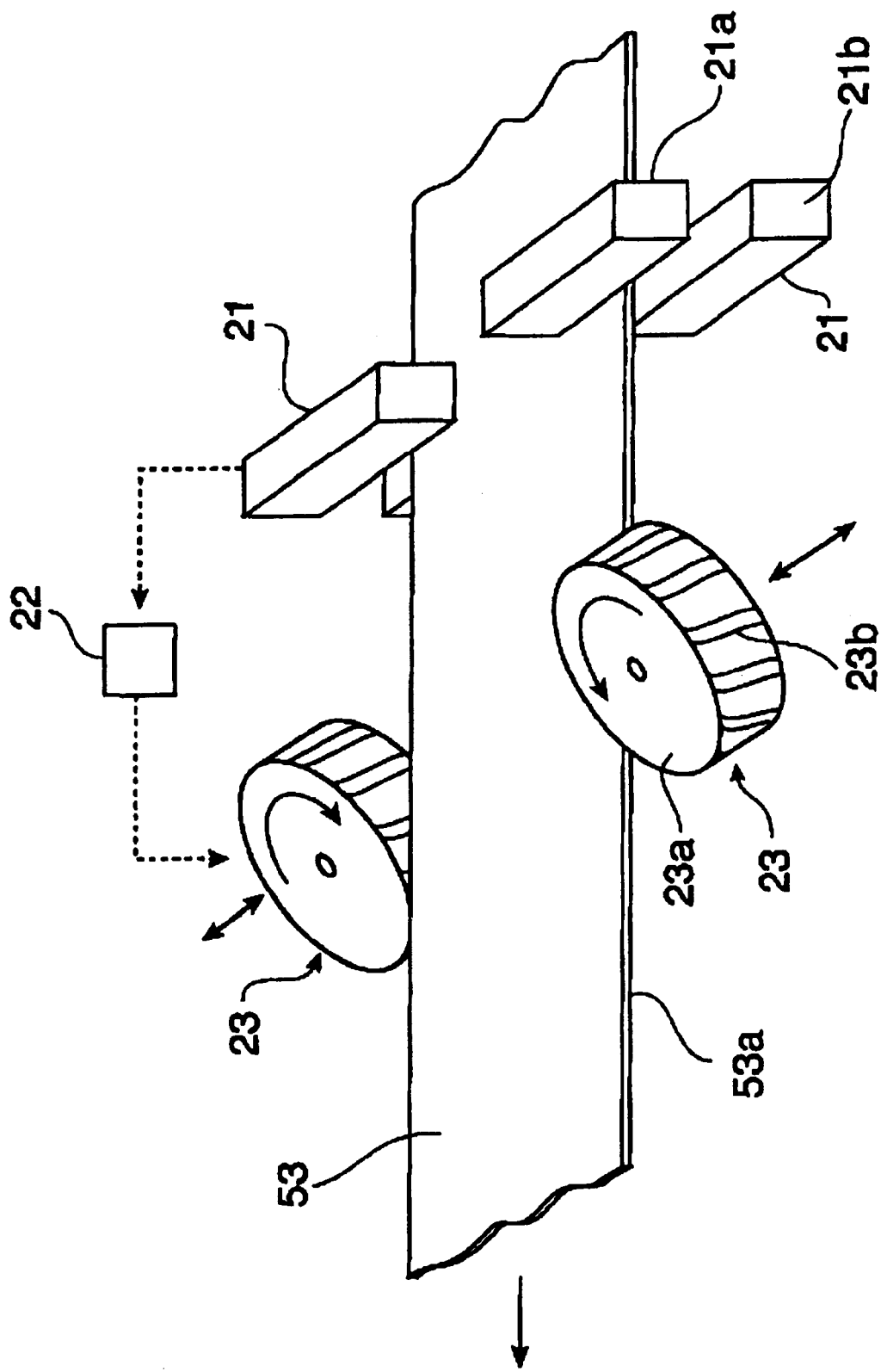
FIG. 5 is an explanatory view of a plate width adjusting apparatus and a plate width adjusting method in accordance with a third embodiment of the present invention.

FIG. 5 is a perspective view of the plate edge detectors and the edge millers.

As shown in FIG. 5, the plate edge detector 21, which measures the position of each edge of the strip 53 to detect the plate edge, is installed at both sides of the strip 53. As the plate edge detector 21, for example, an optical type detector is used, which is provided with a light generation unit 21a and a light receiving unit 21b that are disposed so that the strip 53 is located therebetween. Thereby, the plate edge detectors 21 can detect the plate width without being in contact with the strip 53. As the plate edge detector 21, a detector of other than the optical type is also used in some cases. Also, although not shown in FIG. 5, as the plate width detector 26 as well, a detector that is the same as the plate edge detector 21, such as an optical sensor, is used.

The edge miller 23, which consists of a cylindrical rotator 23a provided with many cutting teeth 23b at the outer periphery, the cutting teeth 23b being inclined with respect to the axial direction of the rotator 23a, is installed at each side of the strip 53. The edge miller 23 is disposed in a state in which the axial direction thereof is inclined with respect to the strip 53, and is provided so as to be capable of being moved toward and away from an edge 53a of the strip 53. By bringing the edge millers 23 into contact with the edge 53a of the strip 53 while the edge millers 23 are rotated, the plate width of the strip 53 can be decreased, so that the plate width can be adjusted.

Next, the operation of the plate width adjusting apparatus 1b and a plate width adjusting method in accordance with this embodiment will be described.

As shown in FIG. 4, as described in the first embodiment, the strip 53 sent out of a payoff reel (not shown) or the like is transferred continuously in the lengthwise direction thereof, and is introduced into the first bridle roll 2, the leveler 4, and the second bridle roll 3 successively, by which the strip 53 is elongated in the lengthwise direction and is shrunken in the width direction, by which the plate width is adjusted.

Figure 6:
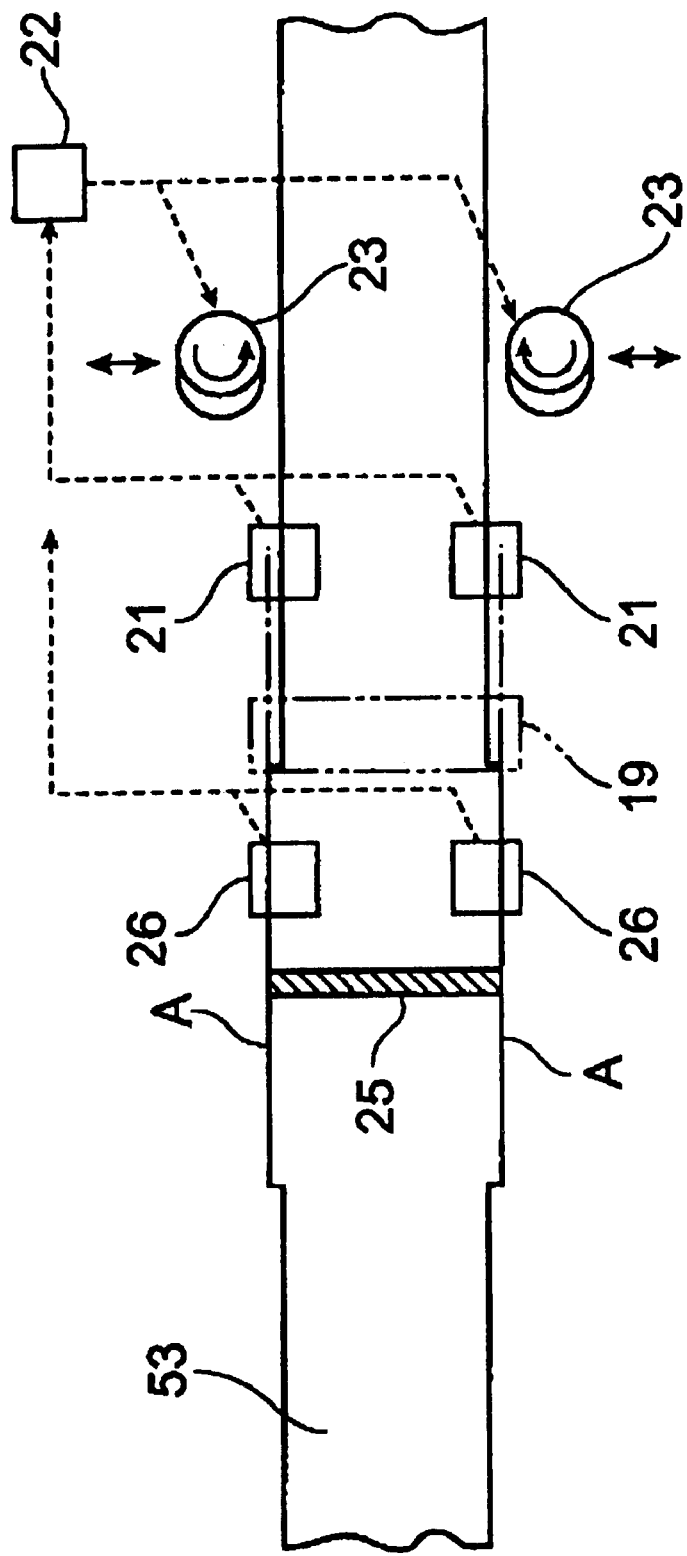
FIG. 6 is an explanatory view of a plate width adjusting apparatus and a plate width adjusting method in accordance with a third embodiment of the present invention.

Then, as shown in FIG. 6, the plate width of the strip 53 is detected by using the plate width detector 26 before the strip 53 is introduced to between the pinch rolls 19, and the detection signal is sent to the control unit 22. The control unit 22 detects a difference in plate width of the strip 53 on receipt of the detection signal, and moves the edge millers 23 toward the strip 3 according to the difference in plate width to start the rotation of the edge millers 23.

After the strip 53 is introduced to between the pinch rollers 19, the edge positions of the strip 53 are detected by using the plate edge detectors 21, and the detection signal is sent to the control unit 22. The control unit 22 determines cutting allowances for the right and left edge millers 23 on receipt of the detection signal, and shifts the miller positions exactly in the width direction so that the cutting allowances are substantially equal for the right and left millers and the cutting width is constant. Thereby, the cutting operation can be performed by following the camber of the strip 53, so that a plate width unadjusted portion can be cut to an exact plate width.

For example, when the strip 53 has a joint portion 25 as shown in FIG. 6, a high tension cannot be applied to this joint portion 25. Therefore, tension and bending force are not applied to a portion in which the joint portion 25 is present by the first bridle roll 2, leveler 4, and second bridle roll 3. As a result, an unadjusted portion A in which the plate width is not adjusted is produced.

Because the unadjusted portion A has a plate width larger than the predetermined specified value, the plate width of that portion must be made the same as that of any other portion. It is the edge millers 23 that adjust the plate width of the unadjusted portion A. Specifically, the unadjusted portion A of the strip 53 is detected by the plate width detector 26 and the plate edge detectors 21, and a control signal is sent from the control unit 22 to the edge millers 23. On receipt of this control signal, the edge millers 23 come into contact with the edges of the strip 53 while being rotated to appropriately cut the edge portions of the unadjusted portion A according to the specified value. Thereby, the plate width adjustment of the strip 53 can be made in the unadjusted portion A.

As described above, according to the plate width adjusting apparatus and the plate width adjusting method in accordance with this embodiment, even if the strip 53 has a portion in which a high tension cannot be applied, such as the joint portion 25, the plate width of the strip 53 can be adjusted continuously. Therefore, the plate width adjustment of the strip 53 can be made efficiently.

Also, the strip 53 is tensioned by the second bridle roll 3 and the third bridle roll 24, and is supported horizontally by the pinch rolls 19 and 20, by which the unadjusted portion A can be detected exactly by the plate width detectors 26. Therefore, the unadjusted portion A of the strip 53 can be cut securely.

Fourth Embodiment

Next, a plate width adjusting apparatus and a plate width adjusting method in accordance with a fourth embodiment will be described.

Figure 7:
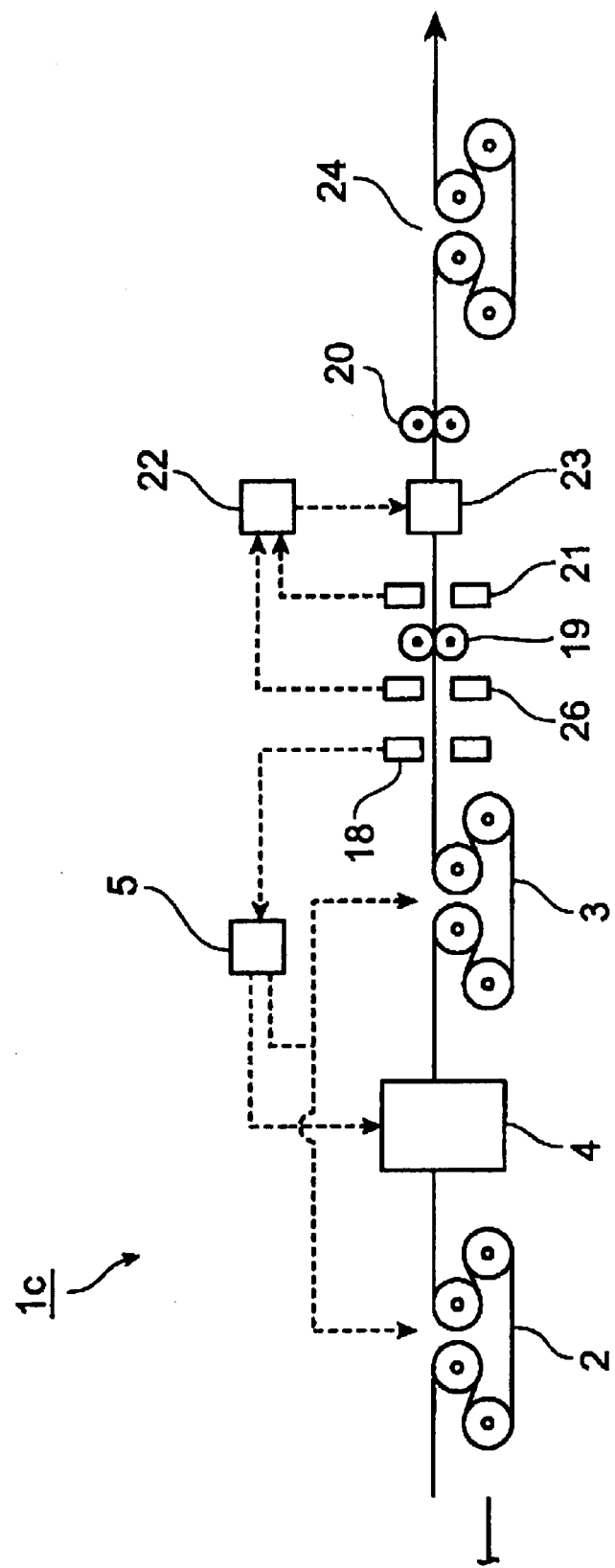
FIG. 7 is an explanatory view of a plate width adjusting apparatus and a plate width adjusting method in accordance with a fourth embodiment of the present invention.
Figure 8:
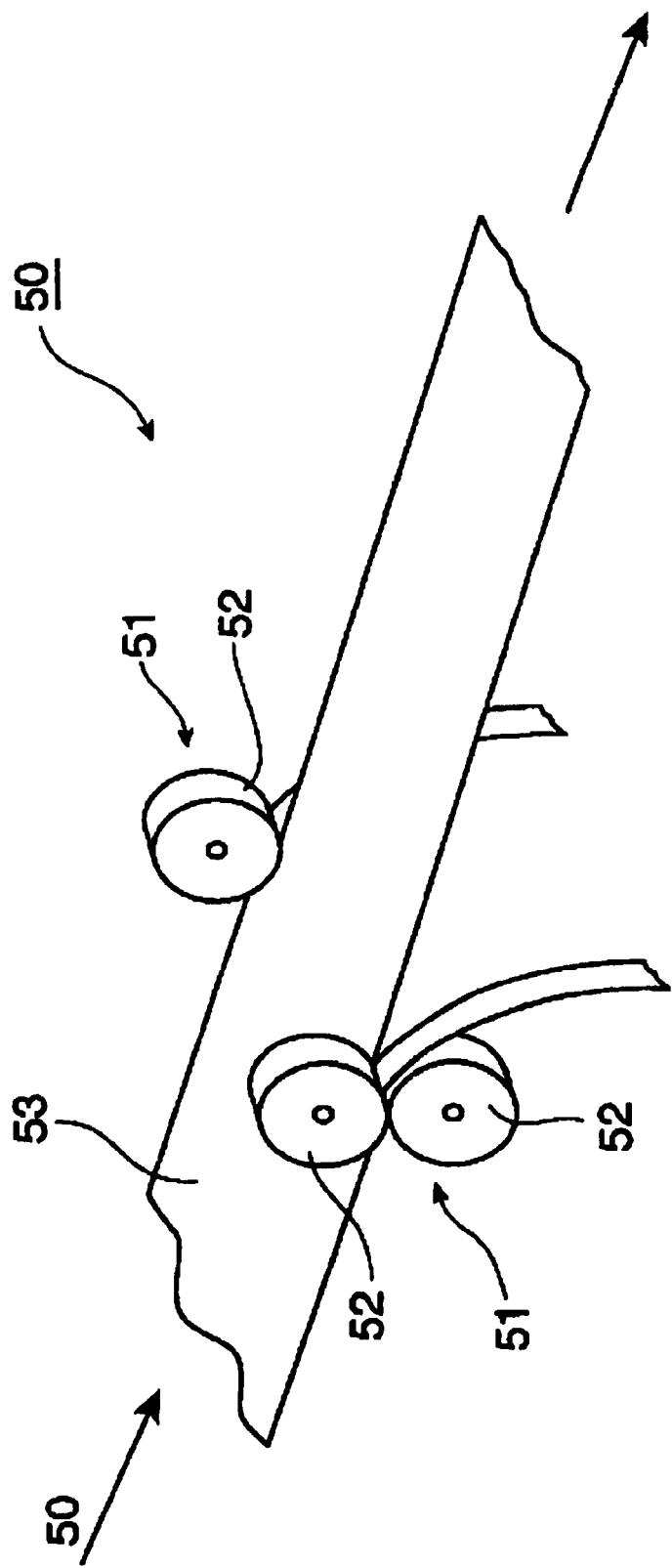
FIG. 8 is an explanatory view of the prior art.

FIG. 7 is a schematic configuration view of a plate width adjusting apparatus in accordance with this embodiment. As shown in FIG. 7, a plate width adjusting apparatus 1c in accordance with this embodiment, which is installed on a strip production line such as a pickling line and an annealing line, is configured in almost the same manner as the plate width adjusting apparatus 1b in accordance with the third embodiment. It differs the plate width adjusting apparatus 1b in accordance with the third embodiment in that the plate width detector 18 and the control unit 5 are provided.

According to the plate width adjusting apparatus 1c and a plate width adjusting method using the plate width adjusting apparatus 1c, in addition to the same effects as those of the plate width adjusting apparatus and the plate width adjusting method in accordance with the third embodiment, an effect can be achieved that the plate width adjustment using the first bridle roll 2, second bridle roll 3, and leveler 4 can be made with high accuracy.

Although the present invention has been described with reference to the embodiments shown in the drawings, it is not limited to these embodiments. All modifications, changes, and additions that are easily made by a person skilled in the art are embraced in the technical scope of the present invention.

The disclosure of Japanese Patent Application 2000-172448 filed on Jun. 8, 2000 including the specification, the claims, the drawings, and the abstract is incorporated herein by reference with its entirety.

What is claimed is:

1. A plate width adjusting apparatus for adjusting a strip for a predetermined plate width, which is installed on a production line for said strip, comprising:

elongating means for elongating said strip being transferred on said production line in the transfer direction of said strip; and means for controlling the elongation of said strip in the transfer direction by using said elongating means and controlling shrinkage in the width direction in order to adjust said plate width to a specified value, wherein said elongating means comprises tension generating means for giving tension in the transfer direction to said strip being transferred and bending means for giving bending force to said strip having been given said tension.

2. The plate width adjusting apparatus according to claim 1, further comprises detecting means for detecting the plate width of said strip, which is installed on the downstream side of the installation position of said elongating means in the transfer direction of said strip, and a detected value of said detecting means is compared with the preset specified value, by which said plate width is adjusted so that the plate width of said strip takes said specified value.

3. The plate width adjusting apparatus according to claim 1, further comprises detecting means for detecting the plate width of said strip, which is installed on the downstream side of the installation position of said elongating means in the transfer direction of said strip, and a detected value of said detecting means is compared with the preset specified value, by which said plate width is adjusted so that the plate width of said strip takes said specified value.

4. The plate width adjusting apparatus according to claim 2, further comprises cutting means for cutting edges of said strip, which is installed on the downstream side of the installation position of said detecting means in the transfer direction, and cutting control means for causing said cutting means to perform cutting operation on the basis of the detected value of said detecting means so that said strip has a predetermined specified width.

5. The plate width adjusting apparatus according to any one of claims 1 to 3, further comprises correction means for correcting a warp in said strip by giving a vertical pressure to said strip.

6. A plate width adjusting method for adjusting a strip for a predetermined plate width on a production line for said strip, comprising the steps of:

elongating said strip being transferred on said production line in the transfer direction of said strip; and shrinking said strip in the width direction by means of the elongation of said strip, in order to adjust said plate width to a specified value, wherein said strip is elongated by giving tension in the transfer direction to said strip being transferred and by giving bending force to said strip having been given said tension.

7. The plate width adjusting method according to claim 6, wherein a warp in said strip is corrected by giving a vertical pressure to said strip having been elongated.

8. A plate width adjusting apparatus for adjusting a strip for a predetermined plate width, which is installed on a production line for said strip, comprising:

elongating means for elongating said strip being transferred on said production line in the transfer direction of said strip, said elongating means comprising tension generating means for giving tension in the transfer direction to said strip being transferred and bending means for giving bending force to said strip under tension by said tension generating means;

means for controlling the elongation of said strip in the transfer direction using said tension generating means and said bending means, and adjusting shrinkage in the width direction by controlling said tension and bending force in order to adjust said plate width to a specified value;

cutting means for cutting edges of said strip, which is installed on the downstream side of the installation position of said detecting means in the transfer direction; and cutting control means for, in the case where said strip has a portion in which a high tension cannot be applied, causing said cutting means to perform a cutting operation on said portion in order to continuously adjust said plate width to said specified value.

* * * * *